US011356725B2

(12) United States Patent
Aher et al.

(10) Patent No.: US 11,356,725 B2
(45) Date of Patent: Jun. 7, 2022

(54) SYSTEMS AND METHODS FOR DYNAMICALLY ADJUSTING QUALITY LEVELS FOR TRANSMITTING CONTENT BASED ON CONTEXT

(71) Applicant: Rovi Guides, Inc., San Jose, CA (US)

(72) Inventors: Ankur Aher, Maharashtra (IN); Charishma Chundi, Andhra Pradesh (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/072,083

(22) Filed: Oct. 16, 2020

(65) Prior Publication Data

US 2022/0124397 A1 Apr. 21, 2022

(51) Int. Cl.
*H04N 21/2662* (2011.01)
*H04N 21/2343* (2011.01)
*H04N 21/24* (2011.01)
*H04N 21/258* (2011.01)
*H04L 1/00* (2006.01)

(52) U.S. Cl.
CPC ....... *H04N 21/2662* (2013.01); *H04L 1/0014* (2013.01); *H04L 1/0022* (2013.01); *H04N 21/234363* (2013.01); *H04N 21/2402* (2013.01); *H04N 21/25891* (2013.01)

(58) Field of Classification Search
CPC . H04L 1/0014; H04L 1/0022; H04N 21/2402; H04N 21/234363; H04N 21/25891; H04N 21/2662
See application file for complete search history.

(56) References Cited

U.S. PATENT DOCUMENTS

| | | | | |
|---|---|---|---|---|
| 9,626,364 | B2 * | 4/2017 | Mani | H04L 65/80 |
| 9,699,464 | B2 * | 7/2017 | Shao | H04N 19/15 |
| 9,756,347 | B2 * | 9/2017 | Xu | H04N 19/463 |
| 9,900,630 | B2 * | 2/2018 | Gilson | H04N 21/47214 |
| 10,013,772 | B2 * | 7/2018 | Carmel | H04N 19/172 |
| 10,134,121 | B2 * | 11/2018 | Carmel | G06K 9/036 |
| 10,310,928 | B1 * | 6/2019 | Hegar | G06F 11/0709 |
| 10,313,419 | B1 * | 6/2019 | Waggoner | H04L 65/602 |
| 10,560,215 | B1 * | 2/2020 | Hegar | H04L 1/0014 |

(Continued)

OTHER PUBLICATIONS

Rodriguez et al. "The impact of video-quality-level switching on user quality of experience in dynamic adaptive streaming over HTTP", EURASIP Journal on Wireless Communications and Networking 2014, 2014:216, 15 pages. (Year: 2014).*

(Continued)

*Primary Examiner* — George C Neurauter, Jr.
(74) *Attorney, Agent, or Firm* — Haley Guiliano LLP

(57) ABSTRACT

Systems and methods for dynamically adapting quality levels of content is disclosed herein. A content transmission system determines whether to reduce streaming bandwidth of a device that transmits content. In response to determining to reduce the streaming bandwidth, the content transmission system identifies a first plurality of frames of the content based on a first context and a second plurality of frames of the content based on a second context. The content transmission system transmits the first plurality of frames at a first quality level based on the first context and the second plurality of frames at a second quality level that is higher than the first quality level based on the second context.

20 Claims, 10 Drawing Sheets

(56) References Cited

U.S. PATENT DOCUMENTS

| | | | |
|---|---|---|---|
| 10,674,158 B2* | 6/2020 | Carmel | H04N 19/103 |
| 10,728,152 B2* | 7/2020 | Lau | H04L 47/12 |
| 10,827,181 B1* | 11/2020 | Sen | H04N 21/26258 |
| 10,911,762 B2* | 2/2021 | Mittal | H04N 19/172 |
| 10,965,970 B2* | 3/2021 | Gilson | H04N 21/6581 |
| 11,064,230 B2* | 7/2021 | Nielsen | H04N 21/6582 |
| 11,076,187 B2* | 7/2021 | Kalagi | H04N 21/84 |
| 11,109,082 B2* | 8/2021 | Patro | H04L 65/4084 |
| 2004/0125877 A1 | 7/2004 | Chang et al. | |
| 2007/0172211 A1* | 7/2007 | Panda | H04N 19/152 386/313 |
| 2012/0141089 A1* | 6/2012 | Hunt | H04N 21/2385 386/239 |
| 2013/0013803 A1* | 1/2013 | Bichot | H04L 65/80 709/231 |
| 2013/0223509 A1* | 8/2013 | Tweedale | H04N 21/234327 375/240.01 |
| 2014/0211859 A1* | 7/2014 | Carmel | H04N 19/172 375/240.26 |
| 2014/0226711 A1* | 8/2014 | Ramamoorthy | H04N 19/40 375/240.02 |
| 2014/0282771 A1* | 9/2014 | Tumuluru | H04N 21/2662 725/95 |
| 2016/0241898 A1* | 8/2016 | Korz | H04N 21/658 |
| 2017/0134459 A1* | 5/2017 | Shetty | H04L 65/80 |
| 2017/0171271 A1 | 6/2017 | Kelly et al. | |
| 2018/0063536 A1* | 3/2018 | Carmel | H04N 19/115 |
| 2019/0166170 A1* | 5/2019 | Ramaswamy | H04N 21/2358 |
| 2019/0327510 A1* | 10/2019 | Kalagi | H04N 21/2662 |
| 2020/0228841 A1* | 7/2020 | Smith | H04N 19/154 |
| 2021/0112292 A1* | 4/2021 | Sivaramalingam | H04N 21/2662 |

OTHER PUBLICATIONS

Lainema et al. "Angular Intra Prediction in High Efficiency Video Coding (HEVC)", IEEE MMSP 2011, 5 pages. (Year: 2011).*

Rodriguez et al. "Video Quality Assessment in Video Streaming Services Considering User Preference for Video Content", 2014 IEEE International Conference on Consumer Electronics (ICCE), 2 pages. (Year: 2014).*

Ammar et al. "HEVC saliency map computation", IS&T International Symposium on Electronic Imaging 2016, Human Vision and Electronic Imaging 2016, 8 pages. (Year: 2016).*

Fernandes et al. "Efficient HEVC intra-frame prediction using curved angular modes", Electronics Letters, Oct. 8, 2018, vol. 54 No. 21, 2 pages. (Year: 2018).*

Liu et al. "Overview of HEVC extensions on screen content coding", 2015, 12 pages. (Year: 2015).*

Mozilla Foundation. "Web video codec guide", MDN web docs, publicly posted Sep. 24, 2020, 36 pages. (Year: 2020).*

PCT International Search Report for International Application No. PCT/US2020/066981, dated Jul. 14, 2021 (13 pages).

"Adaptive Bitrate Streaming," https://bitmovin.com/adaptive-streaming (10 pages) (downloaded Aug. 2021).

"Adaptive bitrate streaming," Wikipedia, https://en.wikipedia.org/wiki/Adaptive_bitrate_streaming; downloaded Aug. 20, 2021 (10 pages).

Spiteri et al., "BOLA: Near-Optimal Bitrate Adaptation for Online Videos", EEE/ACM Transactions on Networking, 28 (4):1698-1711 (2020) (doi: 10.1109/TNET 2020.2996964).

Spiteri et al., "From theory to practice: Improving bitrate adaptation in the DASH reference player," ACM Transactions an Multimedia Computing, Communications, and Applications, 15(67):1-29 (2019) (https://doi org/10.1145/3336497).

* cited by examiner

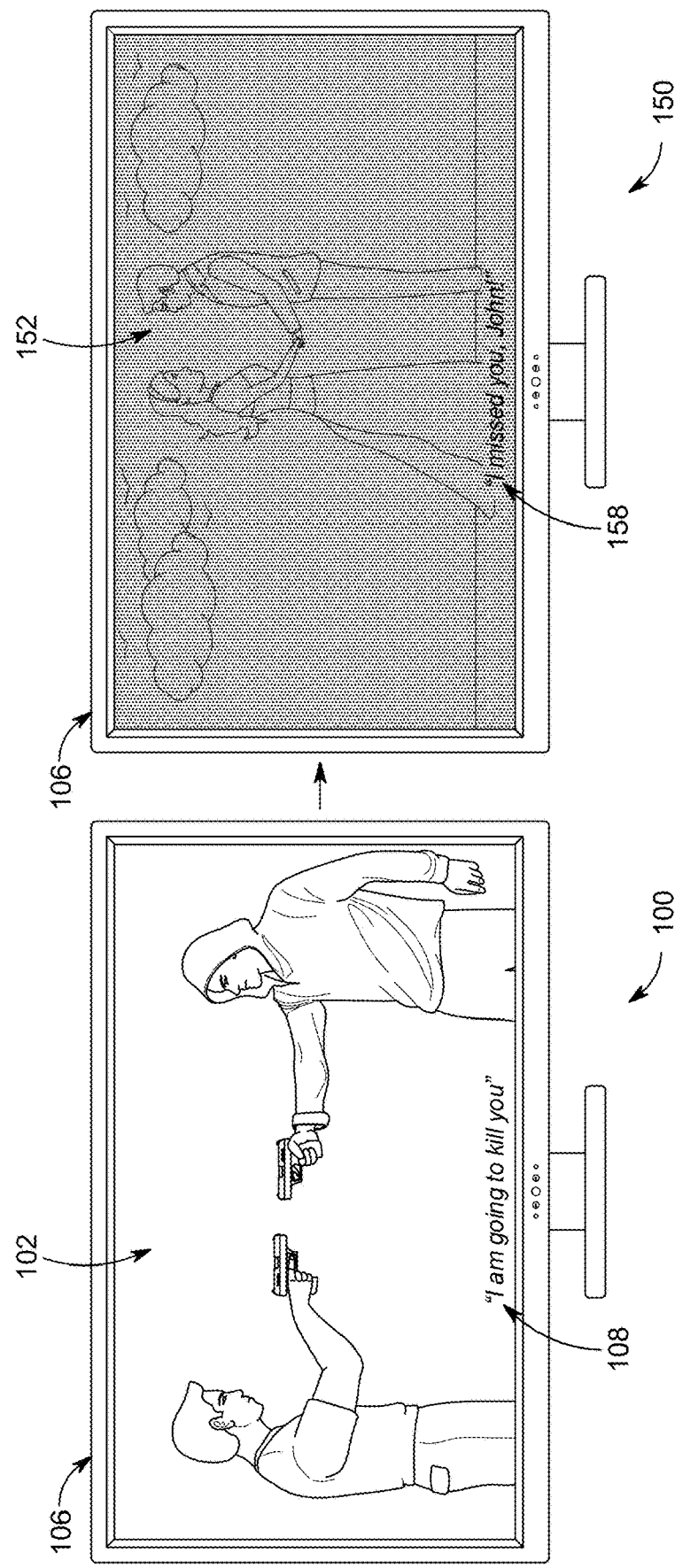

600 ⟶

| | Frame 1 | Frame 2 | Frame 3 | Chunk 1 |
|---|---|---|---|---|
| Score | 0.5 | 3.8 | 9.6 | 6.7 |

| | Frame 1 | Frame 2 | Frame 3 | Chunk 2 |
|---|---|---|---|---|
| Score | 37 | 81 | 95 | 77 |

FIG. 6B

SYSTEMS AND METHODS FOR DYNAMICALLY ADJUSTING QUALITY LEVELS FOR TRANSMITTING CONTENT BASED ON CONTEXT

BACKGROUND

This disclosure is generally directed to dynamically adjusting video quality levels. In particular, methods and systems are provided for transmitting video content at variable quality levels in response to available bandwidth.

SUMMARY

With the increased use of internet service in modern society, the load on Internet Service Providers networks has increased significantly. As a result, numerous situations demand frugal use of data transfer when consuming heavy load content, such as video content. However, in many cases, consumers of video content still prefer to keep the video quality level consistent even when the device is on a frugal data mode because reducing the video quality level will adversely affect the user experience with the video contents.

To overcome such problems, methods and systems are described herein for dynamically adjusting video quality level when transmitting video contents while upholding the user experience with the video contents that may otherwise be suffered due to a reduction in streaming quality for the video contents.

The present disclosure addresses the problems described above by, for example, transmitting frames of video content at variable quality levels to alleviate the network load during the video consumption, thereby reducing the burden on the network. In some embodiments, a content transmission system determines whether to reduce the streaming bandwidth of a device that transmits content. For example, when a user is traveling to an uninhabited area such as a valley, a mobile network connection may drop. The content transmission system may detect that the streaming bandwidth of the device is going to be reduced due to a location change. Upon determining to reduce the streaming bandwidth, the content transmission system identifies a first plurality of frames of the content based on a first context and a second plurality of frames of the content based on a second context.

For example, the first plurality of frames of the content may include certain scenes of the content that may be more relevant to the user than other scenes (e.g., action scene vs. romance scene). In another example, the first plurality of frames of the content may include more certain scenes of the content that are important to the content itself than other scenes of the content (e.g., climax scene vs. ending credits). To maximize the user experience and optimize the data transfer with the limited available bandwidth, the content transmission system transmits the first plurality of frames at a first quality level based on the first context and the second plurality of frames at a second quality level that is lower than the first quality level based on the first context.

In some embodiments, the content transmission system receives user profile information for the user that requests the content. The user profile information may include a user's preference in scenes or genres. For example, a user may indicate that the user is more interested in an action scene than a romance scene. Based on the user profile information, a first relevance level, and a second relevance level for scenes (e.g., frames) of the content are determined. Each scene of the content may be transmitted at a quality corresponding to the determined relevance level. In an example, an action scene of a movie may be transmitted at the first quality level that is higher than a second quality level at which a romance scene is transmitted.

In some embodiments, the content transmission system receives metadata of the content. The metadata may include a set of data describing the content. Based on the metadata of the content, the content transmission system determines a respective importance level of each scene. For example, a movie consists of scenes of variable importance. In one embodiment, a climax scene of a movie is of higher importance than an ending credit scene. Thus, the climax scene is determined to be associated with a first relevance level that is higher than a second relevance level to which an ending credit scene is associated with. When the movie is transmitted, the climax scene that is associated with the first relevance level is transmitted at the first quality level that is higher than the second quality level at which the ending credit scene that is associated with the second relevance level is transmitted.

In another embodiment, the content transmission system determines a number of edges in a scene and determines whether to transmit a quality level based on the number of edges. For example, the content transmission system identifies a number of edges in each scene of a movie and transmits a scene that has a higher number of edges at the first quality level than a scene that has a smaller number of edges at the second quality level that is lower than the first quality level. In one embodiment, the higher number of edges in a frame, the more sensitive the frame is when a quality level is changed. A frame with more edges may look more distorted than a frame with fewer edges when changed to a lower quality level. In a related embodiment, the content transmission system may identify different portions within a single frame to determine the number of edges. For example, if a certain portion of a single frame (e.g., a portion with a desk and a chair) is determined to have more edges than another portion of the frame (e.g., a portion with a lake), then the portion with the desk and chair is transmitted at a higher quality level than the portion with the lake within the single frame.

In one embodiment, the content transmission system determines a number of curves in a scene and determines a quality level based on the number of curves. For example, the content transmission system identifies a number of curves in each scene of a movie and transmits a scene that has a higher number of curves at the first quality level than a scene that has a smaller number of curves at the second quality level that is lower than the first quality level. In one embodiment, the higher number of curves in a frame, the more sensitive the frame is when a quality level is changed. A frame with more curves may look more distorted than a frame with fewer curves when changed to a lower quality level. In a related embodiment, the content transmission system may identify different portions within a single frame to determine the number of curves. For example, if a certain portion of a single frame (e.g., a portion with a curtain) is determined to have more curves than another portion of the frame (e.g., a portion with a wall), then the portion with the curtain is transmitted at a higher quality level than the portion with the wall within the single frame.

In one embodiment, the content transmission system generates a color map for each frame. The color map may include pixel values for each segment of the frame. For example, the content transmission system determines a region based on the color map. Groups of adjacent pixels or similar pixel values may form a region. In some embodiments, a frame with more regions may contribute to more edges in a frame. Accordingly, the frame with more regions may get more distorted than the frame with fewer regions when changed to a low quality level. The content transmission system uses the color map to determine the number of regions within a frame and determines a quality level of the frame based on the number of regions identified in the frame. In a related embodiment, the content transmission system may identify different portions within a single frame to determine the number of regions. For example, if a certain portion of a single frame includes five regions (e.g., regions with more similar pixel values), then that portion is transmitted at a higher quality level than a portion that includes two regions (e.g., regions with less similar pixel values), as the distortion is likely to be more obvious in the portion with more regions.

In some embodiments, the content transmission system may calculate a score for a frame. For example, each frame is assigned a frame score calculated by the content transmission system based on one or more factors described above. The content transmission system may determine a respective quality level based on the frame score. In some cases, the transmission system may calculate a chunk score for a set of frames. For example, a first chunk consists of a first plurality of frames that comes before a second chunk that consists of a second plurality of frames of the content. Based on each frame score of a respective chunk, a chunk score may be calculated. In other words, a chunk score is likely to be high if the associated frame scores are high and thus, the chunk with higher frame scores is likely to be transmitted at a higher quality level than a chunk with lower frame scores.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1A and FIG. 1B show illustrative depiction of a content transmission system transmitting content at variable quality levels based on a relevance level in context of a user profile, in an accordance with some embodiments of the disclosure;

FIG. 6A and FIG. 6B show illustrative embodiments of calculating a chunk score based on frame scores, in an accordance with some embodiments of the disclosure;

DETAILED DESCRIPTION

Figure 2B:
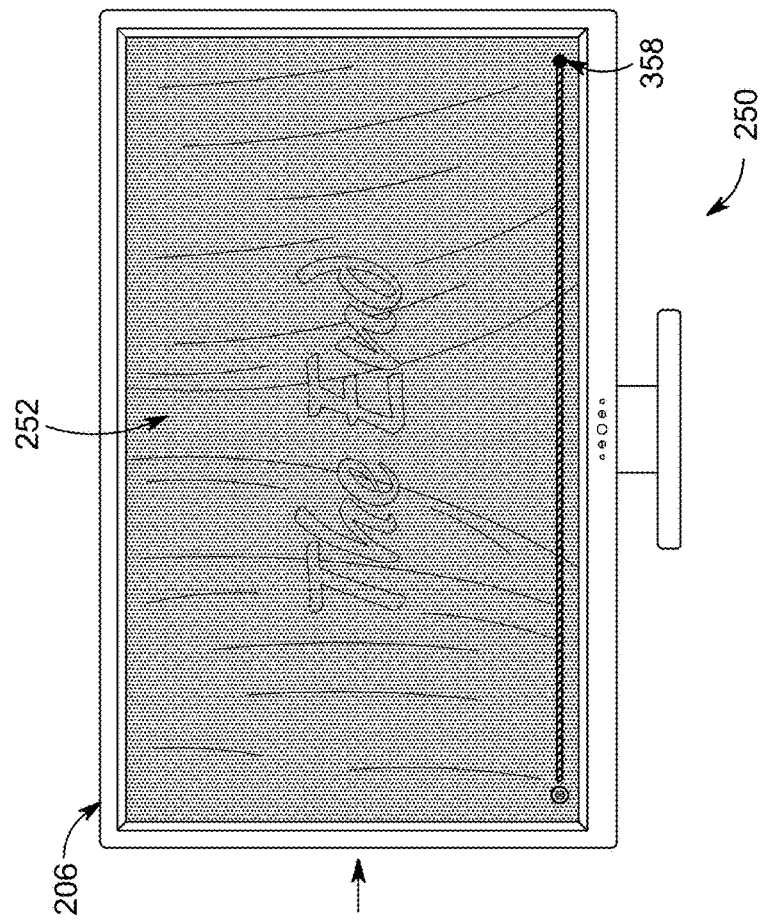
FIG. 2A and FIG. 2B show illustrative depiction of the content transmission system transmitting content at variable quality levels based on an importance level in context of the content, in an accordance with some embodiments of the disclosure.

FIG. 1A shows an illustrative depiction 100 of the content transmission system transmitting a frame 102 of content at a high quality level for display on a user device 106. Although FIG. 1A depicts user device 106 as a television, it will be understood that any suitable device for displaying video content may be used, such as computer equipment or wireless user communications device discussed below in relation to FIG. 10. The user device 106 may have control circuitry (e.g., control circuitry 904 discussed later in more detail with reference to FIG. 9) configured to request a video content stream from a server for display (e.g., on a display such as display 912 discussed later in more detail with reference to FIG. 9).

As shown in FIG. 1A, user device 106 requests for audio-visual content that includes a group of frames. It will be understood that, consistent with the present disclosure, any content may be requested for streaming from the server. As referred to herein, the term "content" should be understood to mean an electronically consumable media asset, such as television programming, as well as pay-per-view programs, on-demand programs (such as video-on-demand (VOD) systems), Internet content (e.g., streaming content, downloadable content, Webcasts, etc.), video clips, audio clips, content information, pictures, rotating images, documents, playlists, websites, articles, books, electronic books, advertisements, blogs, chat sessions, social media applications, video games, and/or any other media or multimedia and/or combination of the same. As used herein, the term "multimedia" should be understood to mean content that uses at least two different content forms described above, for example, text, audio, video, images, or interactivity content forms. Content may be recorded, played, displayed, or accessed by the user devices.

The content transmission system, in response to receiving the request for the video stream, may determine the network condition for the communication network and a range of device types. In some embodiments, content includes a group of frames (e.g., images) that are encoded at certain bitrates and transmitted at certain quality levels for display that is appropriate for the available bandwidth of the network condition. The content transmission system may employ a streaming algorithm that dynamically adapts a video streaming quality based on the bandwidth availability, such as an Adaptive Bitrate (ABR) streaming algorithm. Any bitrate adaptation algorithm or streaming algorithm can be used to adapt the video quality to optimize the user viewing experience.

Based on the network condition, the content transmission system determines the network connectivity and a range of devices. Using this information, the content transmission system determines whether to reduce the streaming quality of content that is different from the certain quality level at which the content would otherwise be transmitted. This will be discussed later in more detail with reference to FIG. 8.

In some embodiments, the content transmission system retrieves user profile for a user requesting the content. For example, the content transmission system may retrieve user preference information, such as the user's favorite genres or scenes or least favorite genres and scenes of the content. Based on the retrieved user preferences for a user, the content transmission system determines a respective relevance level of a frame of the content. The content transmission system analyzes each frame of the video stream (i.e., each frame that composes the movie) or groups of frames to identify whether a frame consists of a scene of interest to the user. In one embodiment, the content transmission system may use one or more well-known methods of recognizing objects in frames. For example, if the user indicates that the user prefers an action scene over a romance scene, then the content transmission system determines that frame 102 is of higher relevance to the user (e.g., frame 102 includes a gun). In another embodiment, the content transmission system may use the descriptions of each scene that are associated with the content provided by the streaming sources or any other available sources. For example, if a movie includes scene descriptions for the content, then the content transmission system may extract a key phrase that is associated with the action scene (e.g., "holding guns") and determine that frame 102 is of high relevance to the user. In a related embodiment, the content transmission system may use subtitles or scripter of the content to determine whether the frame is of high importance to the user. For example, if the close captioning 108 includes certain words that can indicate a genre of the scene (e.g., "I am going to kill you"), then the content transmission system determines that frame 102 is of high relevance to the user.

Based on the determined relevance level, the content transmission system determines a context for the frame. For example, frame 102 of a first relevance level (e.g., high relevancy) is determined to be associated with a first context. In some embodiments, a context is associated with a corresponding video streaming quality level at which the content is transmitted for display. Based on the determined context (e.g., first context), the content transmission system transmits frame 102 at a first quality level. In some embodiments, the first quality level may be a high or default quality level at which the content was going to be encoded and transmitted. For illustration purposes, the first quality level may be any high definition quality level, such as ultra-high definition (UHD) or any equivalent high definition.

In some embodiments, frame 102 may be part of the action scene frames of the content. In FIG. 1A, a single frame is depicted for illustration purposes. However, a plurality of frames including frame 102 may be associated with the first context and may be transmitted at the first quality level based on the first context.

In contrast to FIG. 1A, FIG. 1B shows an illustrative depiction 150 of the content transmission system transmitting a frame 152 of content at a lower quality level for display on user device 106. Upon determining to reduce the streaming bandwidth of user device 106, the content transmission system transmits frame 152 at a quality different from the first quality level if frame 152 consists a scene of low relevance to the user.

Based on the retrieved user profile information, the content transmission system may determine that frame 152 is of low relevance to the user. For example, the content transmission system identifies objects in frame 152 (e.g., a couple and clouds) and determines that frame 152 includes a romance scene. In another example, the content transmission system may extract a keyword from a subtitle 158 of frame 152 (e.g., "I missed you, John!") and determines that frame 152 includes a romance scene. In another example, the content system may use scene description or scripter (e.g., holding hands) and determines that frame 152 includes a romance scene.

Based on the determined relevance level of frame 152 (e.g., low relevancy), the content transmission system determines a context for the frame. For example, the content transmission system determines that frame 152 is of low relevancy (e.g., second relevance level) and is associated with a second context. To reduce the streaming bandwidth, the content transmission system transmits frame 152 at a second quality level that is lower than the first quality level based on the second context. In some embodiments, the second quality level may be any quality level that is lower than the first quality level, such as a standard quality level (SD).

In some embodiments, frame 152 may be part of the romance scenes of the content. In FIG. 1B, a single frame is depicted for illustration purposes. However, a plurality of frames, including frame 152, may be associated with the second context and may be transmitted at the second quality level based on the second context.

Figure 2A:
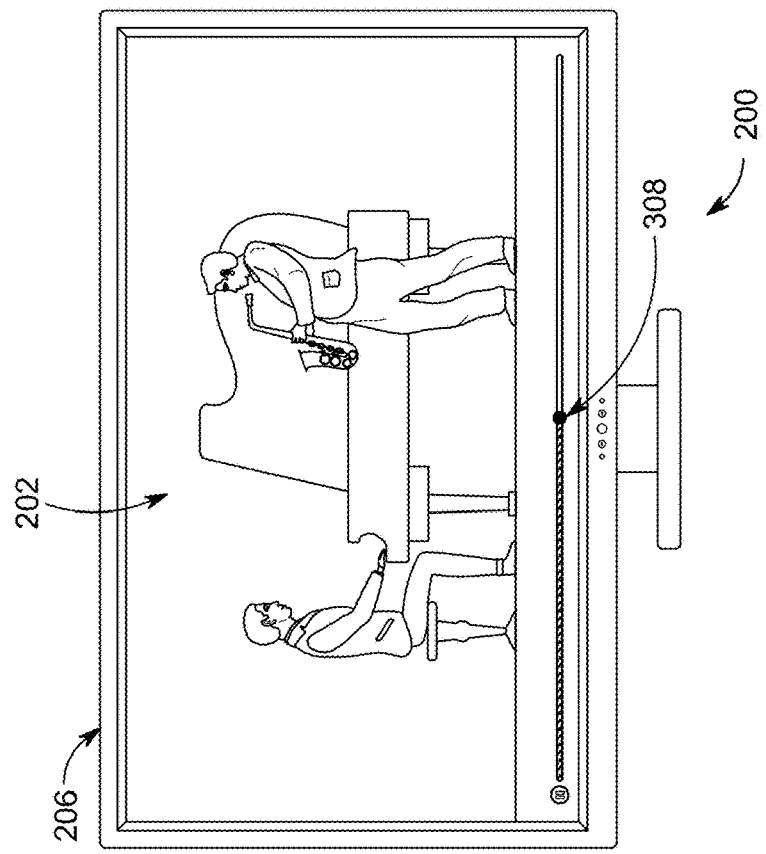

FIG. 2A shows an illustrative depiction 200 of the content transmission system transmitting a frame 202 of content at a high quality level for display on a user device 206. The content transmission system, in response to receiving the request for the video stream, the content transmission system may retrieve metadata of the content from content source 1016 or content data source 1018 of FIG. 10. The content transmission system may use the metadata associated with the content to determine an important level of a frame of content. An importance level of a frame indicates a relative importance of the frame with respect to other frames of the content. For example, a climax scene of a movie is likely to be more important than a closing scene or a post-credit scene because the climax scene is likely to include information that resolves a conflict or includes an important storyline or story element of the movie. In some embodiments, the content transmission system may use other available information from the internet or other sources to determine a relative importance of the frame in context of the content.

Frame 202 of FIG. 2A includes a scene in which people are playing instruments with a playback bar 208 indicating the movie is halfway through. Frame 252 of FIG. 2B includes a closing scene with a playback bar 258 indicating the movie is almost ending. Between the two frames, the content transmission system may determine that frame 202 is of higher importance than frame 252. Accordingly, the content transmission system will determine that frame 202 is associated with a first importance level that is higher than a second importance level with which frame 252 is associated. Based on a relative importance level of the frames, varying context may be assigned to a corresponding frame. For example, frame 202 may be assigned to the first context, and frame 252 may be assigned to the second context, which is lower than the first context. The content transmission system may transmit frame 202 at the first quality level and transmit frame 252 at the second quality level that is lower than the first quality level based on the determined contexts.

In some embodiments, the content transmission system calculates a sensitivity level of a frame based on a degree of distortion when the frame is converted from high quality to low quality. A sensitive frame may look more distorted when the quality is changed. Non-limiting examples of factors that affect a sensitivity level of a frame include a number of edges, a number of curves, or a number of regions based on pixel values of the frame.

Figures 3A, 3B:
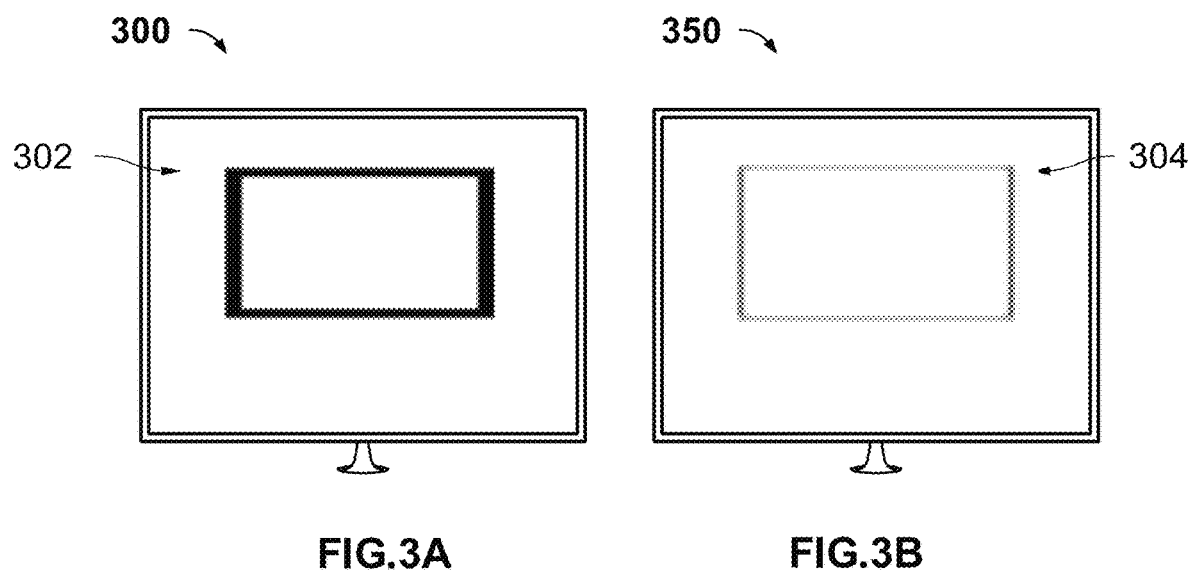
FIG. 3A and FIG. 3B show illustrative depiction of the content transmission system transmitting content at variable quality levels based on a number of edges, in an accordance with some embodiments of the disclosure.

FIG. 3A, FIG. 3B, FIG. 4A and FIG. 4B show illustrative embodiments of the content transmission system transmitting content at variable quality levels based on a number of edges in accordance with some embodiments of the disclosure. In some embodiments, the content transmission system detects how many edges are identified in a frame. FIG. 3A shows an example of content instantiation 300 with a rectangular-shaped object 302 with four edges. Based on the number of edges (4), the content transmission system determines whether to transmit a particular frame at a quality level different from the first quality level to save the network bandwidth.

If an object includes fewer edges, then the distortion of an object 304 is less noticeable when presented for display, as shown in content instantiation 300 of FIG. 3A and content instantiation 350 of FIG. 3B. A content instantiation 350 of FIG. 3B is a converted frame at a lower rate from frame 300 of FIG. 3A. If the number of edges is lower than a threshold value, then the content transmission system transmits a frame at a quality that is different from the first quality level (e.g., lower than the first quality level).

Figures 4A, 4B:
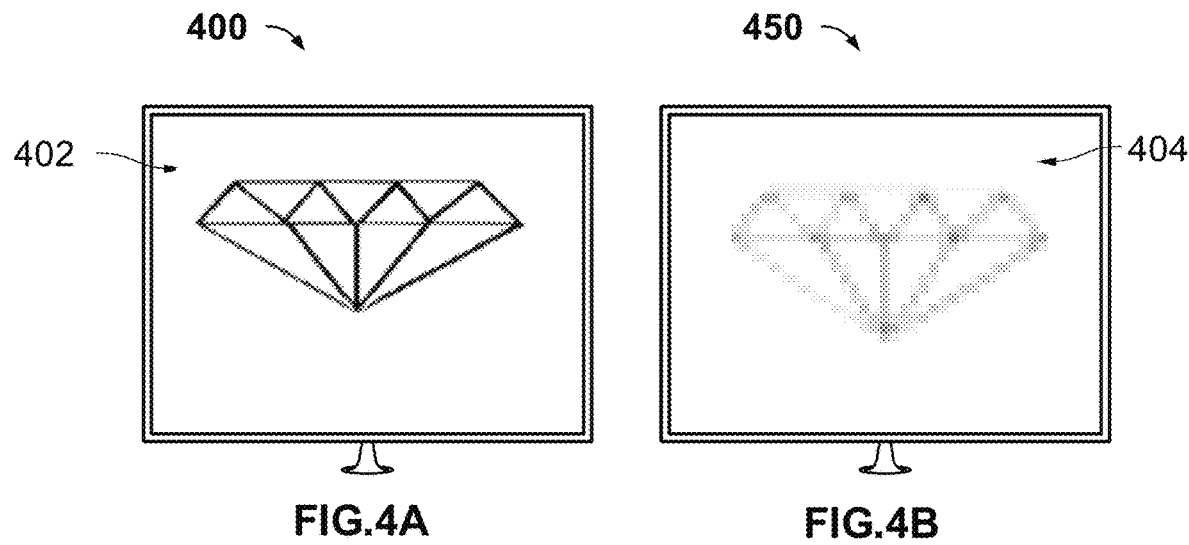
FIG. 4A and FIG. 4B show illustrative depiction of the content transmission system transmitting content at variable quality levels based on a number of edges, in an accordance with some embodiments of the disclosure.

In a related example, the distortion is more noticeable if the object includes more edges, as shown in FIG. 4A and FIG. 4B. For example, FIG. 4A shows an example of content instantiation 400 with a diamond-shaped object 402 with ten edges. As shown in a content instantiation 450 in FIG. 4B, the distortion of an object 404 is more noticeable when the quality level is changed. In this case, the content transmission system may determine that frame 400 is more sensitive than frame 300, as frame 400 includes more edges. Accordingly, frame 300 may be associated with the first context (e.g., less sensitive), and frame 400 may be associated with the second context (e.g., more sensitive).

In one embodiment, the content transmission system determines a number of curves in a frame and determines a quality level based on the number of curves. For example, the content transmission system identifies a number of curves in each scene of the content and transmits a frame that has a higher number of curves at the first quality level than a frame that has a lower number of curves at the second quality level that is lower than the first quality level. A frame with more curves may look more distorted when changed to a lower quality level.

In some embodiments, the content transmission system generates a color map for each frame. The color map may include pixel values for each segment of the frame. For example, the content transmission system determines a region based on the color map. Groups of adjacent pixels or similar pixel values may form a region (e.g., similar pixel intensity regions). In some embodiments, a frame with more regions may contribute to more edges in a frame. Accordingly, the frame with more regions may get distorted when a quality level is changed. The content transmission system uses the color map to determine the number of regions within a frame and determines a quality level of the frame based on the number of regions identified in the frame.

When the content transmission system determines the sensitivity level of a frame, the content transmission system may divide a frame into multiple portions and detect the number of edges or curves, or the number of similar pixel intensity regions within corresponding portions. Each division may be assigned a different sensitivity level based on the number of edges or curves, or the number of similar pixel intensity regions. Each division of a single frame may be transmitted at different quality levels based on the assigned sensitivity.

In a related embodiment, the content transmission system may identify different portions within a single frame to determine the number of edges. For example, if a certain portion of a single frame (e.g., a portion with a castle) is determined to have more edges than another portion of the frame (e.g., a portion with a view of the river), then the portion with the castle is transmitted at a higher quality level than the portion with the river within the single frame.

In a similar embodiment, the content transmission system may identify different portions within a single frame to determine the number of curves. For example, if a certain portion of a single frame (e.g., a portion with a curtain) is determined to have more curves than another portion of the frame (e.g., a portion with a wall), then the portion with the curtain is transmitted at a higher quality level than the portion with the wall within the single frame.

In another related embodiment, the content transmission system may identify different portions within a single frame to determine the number of regions. For example, if a certain portion of a frame includes five regions (e.g., regions with varying pixel values), then that portion is transmitted at a higher quality level than a portion that includes two regions (e.g., regions with less similar pixel values), as the distortion is likely to be more obvious in the portion with more regions.

Figure 5B:
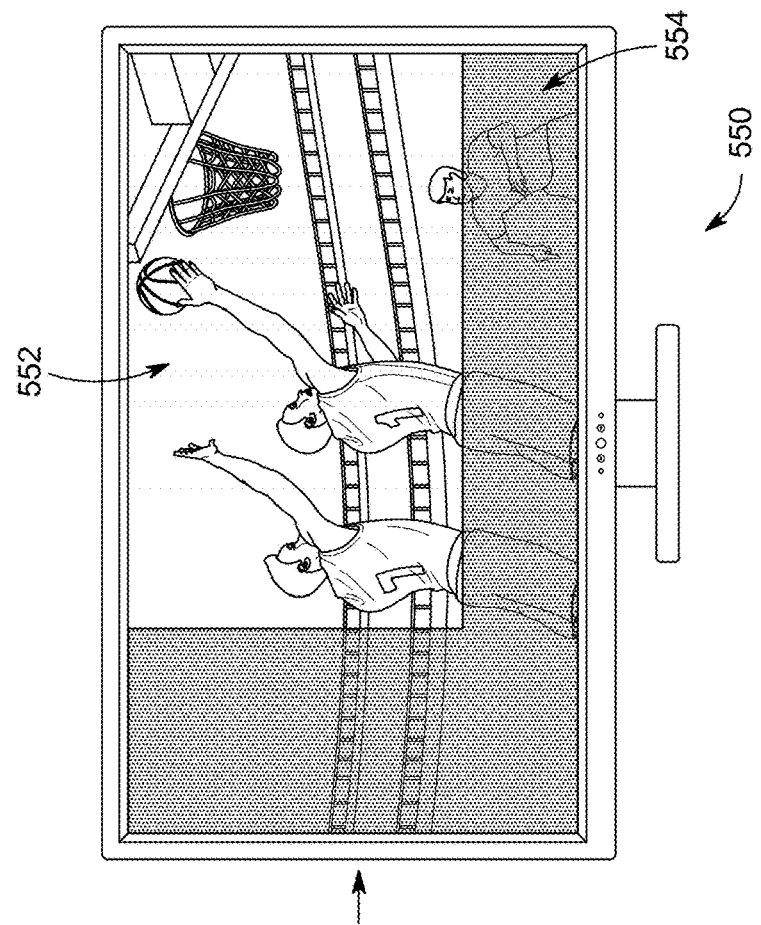
FIG. 5A and FIG. 5B show illustrative depiction of the content transmission system transmitting a frame at variable quality levels, in an accordance with some embodiments of the disclosure.
Figure 5A:
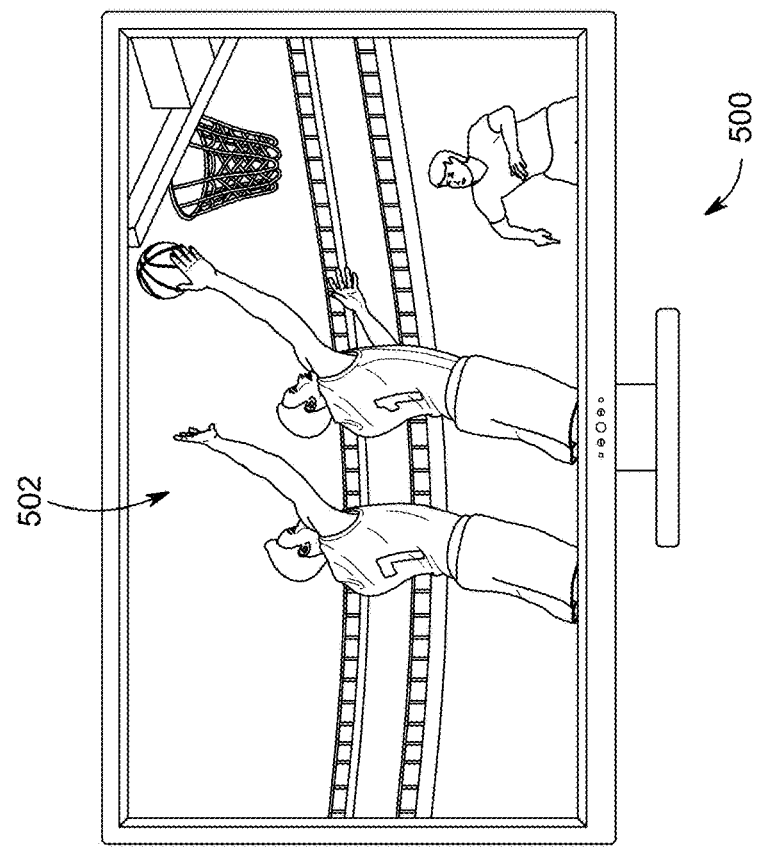

FIG. 5A and FIG. 5B show an illustrative depiction of the content transmission system transmitting a single frame at variable quality levels based on a sensitivity level in an accordance with some embodiments of the disclosure. A content instantiation 500 of FIG. 5A displays a basketball game with a first player trying to dunk and a second player defending against the dunk with the audience as a background. Frame 512 of FIG. 5A may be rendered on a display at the first quality level (e.g., higher quality).

If the content transmission system determines to lower the quality level to accommodate the network bandwidth, then the content transmission system identifies a sensitivity level of frame 502. Based on the number of edges or curves, or the number of similar pixel intensity regions, the content transmission system may determine to keep the quality level of portion 552 at the same quality level (first quality level) and lower the quality level of portion 554. For example, as shown in FIG. 5B, portion 552 includes more edges and curves than portion 554. Also, portion 554 is likely to have more similar pixel intensity (e.g., black for people's hair or brown for the wall of the basketball stadium) than portion 552 (not shown). If a sensitivity level of portion 554 is below a threshold value, then the content transmission system may transmit portion 554 at a lower quality level than a quality level at which portion 552 is transmitted. Portion 552 may also include an action of the players of the ball that the basketball may be identified and the relevant objects around the ball may be transmitted at a higher quality level than the rest in content instantiation 550.

FIG. 6A and FIG. 6B show illustrative embodiments of calculating a chunk score based on frame scores, in accordance with some embodiments of the disclosure. In some embodiments, the content transmission system calculates a frame score of each frame based on a respective importance level, relevance level, or sensitivity level. The content transmission system may use a frame score for each frame to calculate a chunk score. Each chunk is a collection of video frames (e.g., a plurality of frames). A chunk represents video segments typically ranging a few seconds. For example, content (e.g., movie) consists of a set of chunks composed of corresponding subsets of frames. If frames consisting of a chunk have low frame scores, then a corresponding chunk is likely to have a lower chunk score, thereby affecting the chunk score, as shown in table 600 of FIG. 6A. On the other hand, a chunk with a majority of sensitive frames is likely to have a higher chunk score based on high frame scores, as shown in table 650 of FIG. 6B. In this case, a chunk of table 1 may be transmitted at a lower quality level than a chunk of table 2.

Figure 7:
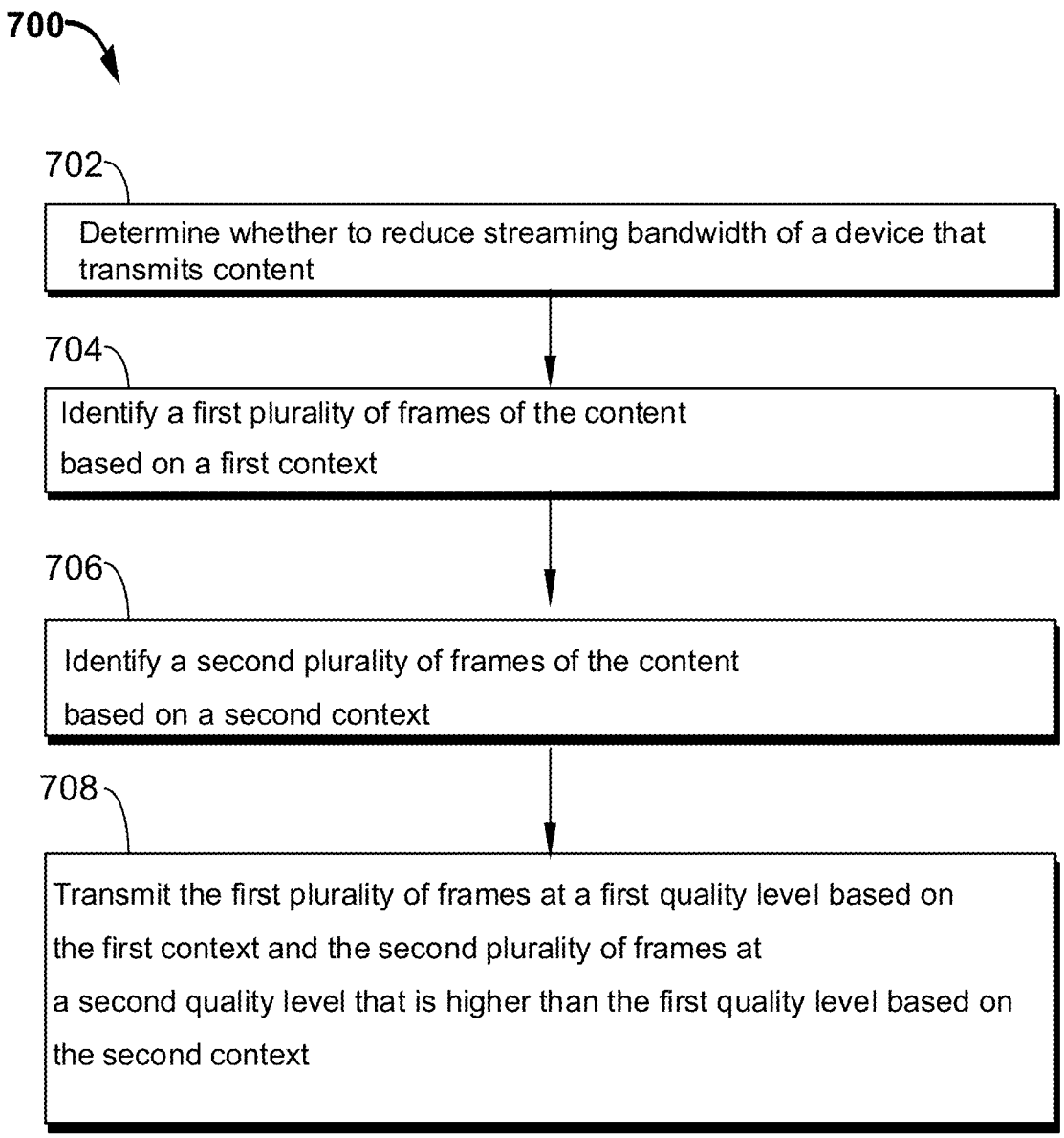
FIG. 7 shows an illustrative process for content transmission at multiple quality levels, in accordance with some embodiments of the disclosure.

FIG. 7 shows a flowchart 700 for transmitting audio-visual content at variable quality levels. It should be noted that process 700 may be performed by the content transmission system. In some embodiments, the process 700 may be performed by control circuitry 904 of user device 900 in FIG. 9. In some embodiments, the process 700 may be performed by control circuitry at a content source 1016 of FIG. 10.

The process 700 may begin at block 702. At block 702, the content transmission system determines whether to reduce the streaming bandwidth of a device that transmits content. The determination of whether to reduce the streaming bandwidth is further explained in connection with FIG. 8.

At block 704, in response to determining to reduce the streaming quality, the content transmission system identifies a first plurality of frames (e.g., first chunk) of content based on a first context. The first plurality of frames may be a portion of frames of the content. In one embodiment, the first context may be determined based on a relevance level of a frame in the context of the user. In a related embodiment, the first context also may be determined based on an importance level of a frame in the context of the content. In another embodiment, the first context may be determined based on a sensitivity level of a frame.

At block 706, the content transmission system identifies a second plurality of frames (e.g., second chunk) of content based on a second context. The second plurality of frames is a part of the content that is different from the first plurality of frames. Determining the context can be based on either or a combination of an importance level, a relevance level, or a sensitivity level. The second context may have different levels of importance, relevance, or sensitivity from the first context. Context can be determined for a chunk, a frame, or a portion of the frame. Therefore, one or more context can be assigned to divisions of a single frame, a frame, or a chunk of frames.

At block 708, the content transmission system transmits the first plurality of frames at a first quality level based on the first context and the second plurality of frames at a second quality level based on the second context. The first quality level may be higher than the second quality level in that the first plurality of frames is presented at a better quality level (e.g., high definition) than the second quality level (e.g., standard definition).

In some embodiments, a quality level means a bit rate, a compression rate, a resolution, or a combination thereof. It should be also understood that the quality level can mean any measurement of display resolution or video processing techniques for display of content. For example, when determining the quality level, the content transmission system determines the value of bitrates at which a chunk should be downloaded by the user device. Alternatively, the content transmission system determines the resolution of a chunk that should be displayed on the user device. The content transmission system may also determine the compression rate at which the data of a chunk should be reduced.

Figure 8:
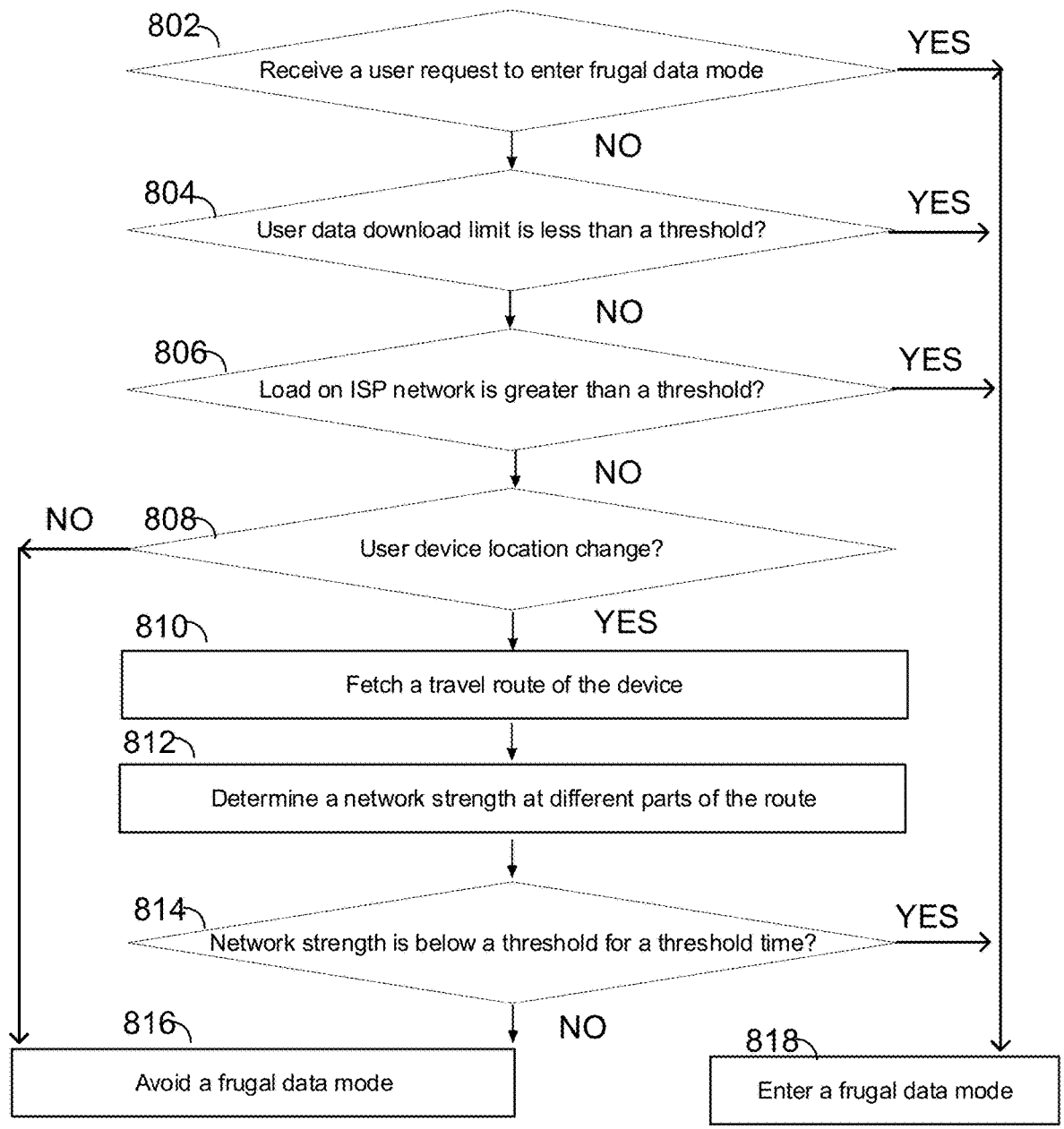
FIG. 8 shows an illustrative process for determining whether to reduce streaming bandwidth of a device that transmits content, in accordance with some embodiments of the disclosure.

FIG. 8 shows a flowchart 800 for determining whether to reduce the streaming bandwidth of a device that transmits the content in accordance with some embodiments of the disclosure. It should be noted that process 800 may be performed by the content transmission system. In some embodiments, the process 800 may be performed by control circuitry 904 of user device 900 of FIG. 9. In some embodiments, the process 800 may be performed by a control circuitry at content source 1016 of FIG. 10.

At block 802, the content transmission system determines whether a request from a user to enter a frugal data mode is received. For example, a user may request to enter a frugal data mode if the user is traveling to a place and a network connection drops. The user may be traveling to a valley where the available bandwidth is reduced or inconsistent. To avoid buffering, the content transmission system may enter a frugal data mode on the user device upon receiving a user request at block 818. Without the request, process 800 continues to block 804.

At block 804, the content transmission system determines whether the data download limit is less than a threshold value. The user device may be associated with a certain data plan in that the user is not allowed to download or stream video content once the data download limit reaches. For example, the user may be traveling with a purchased SIM card to use during the trip. If the data download limit reaches the threshold (e.g., 100 MB), then the content transmission system enters a frugal data mode at block 818. If the data download limit does not reach the threshold, process 800 continues to block 806.

At block 806, the content transmission system determines whether the load on the Internet Service Provider (ISP) network is greater than a threshold value. For example, each ISP may have its own load threshold, which only allows a certain amount of data to be transferred on the network. The content transmission system may determine the bandwidth of other devices on the same network to determine the load on the ISP network (e.g., a home network with four devices). If it is determined that the load on the ISP network is greater than the threshold value, then the content transmission system enters the frugal data mode at block 818. If the load on the ISP network is less than the threshold value, then process 800 continues to block 808.

At block 808, the content transmission system determines whether the location of the user device has been changed. For example, the user may be traveling, and the location may change continuously. Upon determining the location change of the user device based on the location information, process 800 continues to block 810. If the location change was not detected, then the content transmission system avoids the frugal data mode at block 816.

At block 810, the content transmission system fetches the travel route of the user device. Fetching the travel route can be performed in various ways. For example, the user device may have location information (e.g., GPS or based on which base stations the device is communicating with). In another example, if the user is using a navigation app, then the route can be retrieved from the navigation app based on the user travel history and the user's current location. For example, the system may determine that user is commuting to work and retrieve the route from travel history.

At block 812, the content transmission system determines the strength of the network at different parts of the route. The content transmission system determines the network at a specific location of the route to which the user will be traveling to make a prediction on the bandwidth availability in the near future. For example, the system may use historical data (e.g., commuting to work at 8:00 am) or real-time monitoring data to make a prediction on the user's location in the near future.

At block 814, the content transmission system predicts whether the network strength is below a threshold value for longer than a threshold period. Upon determining that the network strength is below a threshold value for a threshold period of time, the content transmission system enters the frugal mode at block 818. If the network strength is greater than the threshold value for longer than the threshold period, then the content transmission system avoids the frugal data mode at block 816.

When the frugal data mode is entered, the content transmission system reduces the streaming bandwidth of the device that transmits the content. For example, to avoid buffering, the content transmission system may resize the video file that is small enough to ensure that the user device receives a default of twenty-four frames per second to continue playing the video without interruption. Alternatively, to avoid rebuffering, the content transmission system may choose certain chunks to be downloaded at lower bitrates. When more bandwidth becomes available at a future time, chunks can be switched back to the normal or higher rates. In some embodiments, the content transmission system has a buffer that allows it to fetch and store chunks before the chunks are rendered for display. This allows the user device to tolerate a brief network disruption without interrupting the playback of the video stream by using buffered chunks.

Figure 9:
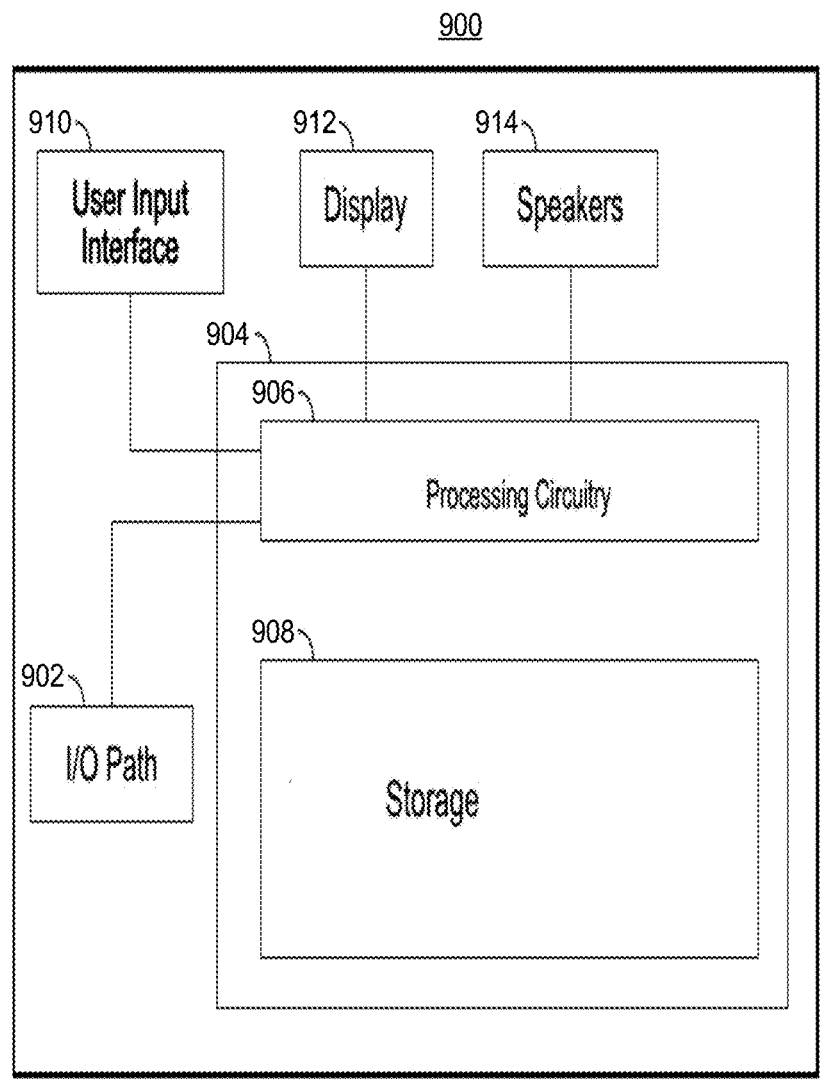
FIG. 9 shows a block diagram of an illustrative user device, in accordance with some embodiments of the disclosure.

FIG. 9 depicts a generalized embodiment of an illustrative device (e.g., user device 106) that displays a video stream. User equipment device 900 may be any of a plurality of user devices such as a smartphone, a tablet, personal computer, set-top box, etc. (discussed further below with respect to FIG. 10). User equipment device 900 may receive the video stream and data via input/output (hereinafter "I/O") path 902. I/O path 902 may provide the video stream (e.g., on-demand programming, Internet content, content available over LAN or WAN, and the like) and data to control circuitry 904, which includes processing circuitry 906 and storage 908. Control circuitry 904 may be used to send and receive commands, requests, and other suitable data using I/O path 902. I/O path 902 may connect control circuitry 904 (and specifically processing circuitry 906) to one or more communications paths (described below in relation to FIG. 10). I/O functions may be provided by one or more of these communications paths but are shown as a single path in FIG. 9 to avoid overcomplicating the drawing.

Control circuitry 904 may be based on any suitable processing circuitry such as processing circuitry 906. Processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., quad-core). In some embodiments, processing circuitry may be distributed across multiple separate processor or processing units, for example, multiple of the same type of processing units (e.g., two Intel Core i7 processors) or multiple different processors (e.g., Ryzen processor with integrated CPU and GPU processing cores) or may include a multi-core processor (e.g., dual-core, quad-core, hexa-core, or any suitable number of cores) or supercomputer. In some embodiments, control circuitry 904 executes instructions for an application stored in memory (e.g., memory 908). Specifically, control circuitry 904 may be instructed by a media application to perform the functions discussed above and below. For example, the media application may provide instructions to control circuitry 904 to request a video stream from server. Moreover, the media application may also collect user profile information and send to server prior to the encoding process. In some implementations, any action performed by control circuitry 904 may be based on instructions received from the media application.

Control circuitry 904 may include tuning circuitry, such as one or more analog tuners, one or more MP3 decoders or other digital decoding circuitry, or any other suitable tuning or audio circuits or combinations of such circuits. Encoding circuitry (e.g., for converting analog or digital signals to signals for storage in storage 908) may also be provided. Control circuitry 904 may also include scaler circuitry for upconverting and downconverting content into the preferred output format of user equipment device 900, and converter circuitry for converting between digital and analog signals. The tuning and encoding circuitry may be used by user equipment device 900 to receive, play, and buffer content. The circuitry described herein, including for example, the tuning, audio generating, encoding, decoding, encrypting, decrypting, scaler, and analog/digital circuitry, may be implemented using software running on one or more general purpose or specialized processors. If storage 908 is provided as a separate device from user equipment device 900, the tuning and encoding circuitry may be associated with storage 908.

Storage 908 may be any device for storing electronic data, such as random-access memory, solid state devices, quantum storage devices, hard disk drives, non-volatile memory or any other suitable fixed or removable storage devices, and/or any combination of the same. Control circuitry 904 may allocate portions of storage 908 for various purposes such as caching application instructions, recording media assets, storing portions of a media asset, buffering segments of media, etc. As described herein, storage 908 may be used to store one or more LUTs storing a number of MAC addresses associated with a plurality of user equipment devices and their corresponding profile information.

A user may send instructions to control circuitry 904 using user input interface 910. User input interface 910 may be any suitable user input interface, such as a remote control, mouse, trackball, keypad, keyboard, touch screen, touchpad, stylus input, joystick, voice recognition interface, or other user input interfaces. Instructions to control circuitry 904 may be transmitted through I/O path 902, that could consist of a video tracking and detection mechanism, Internet of Things (IoT) and home automation triggers, emergency alert systems, and software or hardware communication pipelines and/or notification centers.

Display 912 may be provided as a stand-alone device or integrated with other elements of each one of user equipment device 900. For example, display 912 may be a touchscreen or touch-sensitive display, a projector, or a casting device. In such circumstances, user input interface 910 may be integrated with or combined with display 912. Display 912 may be one or more of a monitor, a television, a liquid-crystal display (LCD) for a mobile device, silicon display, e-ink display, light-emitting diode (LED) display, or any other suitable equipment for displaying visual images. Graphics processing circuitry may generate the output to the display 912. In some embodiments, the graphics processing circuitry may be external to processing circuitry 906 (e.g., as a graphics processing card that communicates with processing circuitry 906 via I/O path 902) or may be internal to processing circuitry 906 or control circuitry 904 (e.g., on a same silicone die as control circuitry 904 or processing circuitry 906). In some embodiments, the graphics processing circuitry may be used to receive, display, and play content.

Speakers 914 may be provided as integrated with other elements of user equipment device 900 or may be stand-alone units. The audio component of videos and other content displayed on display 912 may be played through speakers 914. In some embodiments, the audio may be distributed to a receiver (not shown), which processes and outputs the audio via speakers 914. The speakers 914 may be part of, but not limited to, a home automation system.

The media application may be implemented using any suitable architecture. For example, it may be a stand-alone application wholly implemented on user equipment device 900. The user interface application and/or any instructions for performing any of the embodiments discussed herein may be encoded on computer-readable media. Computer-readable media includes any media capable of storing data.

Figure 10:
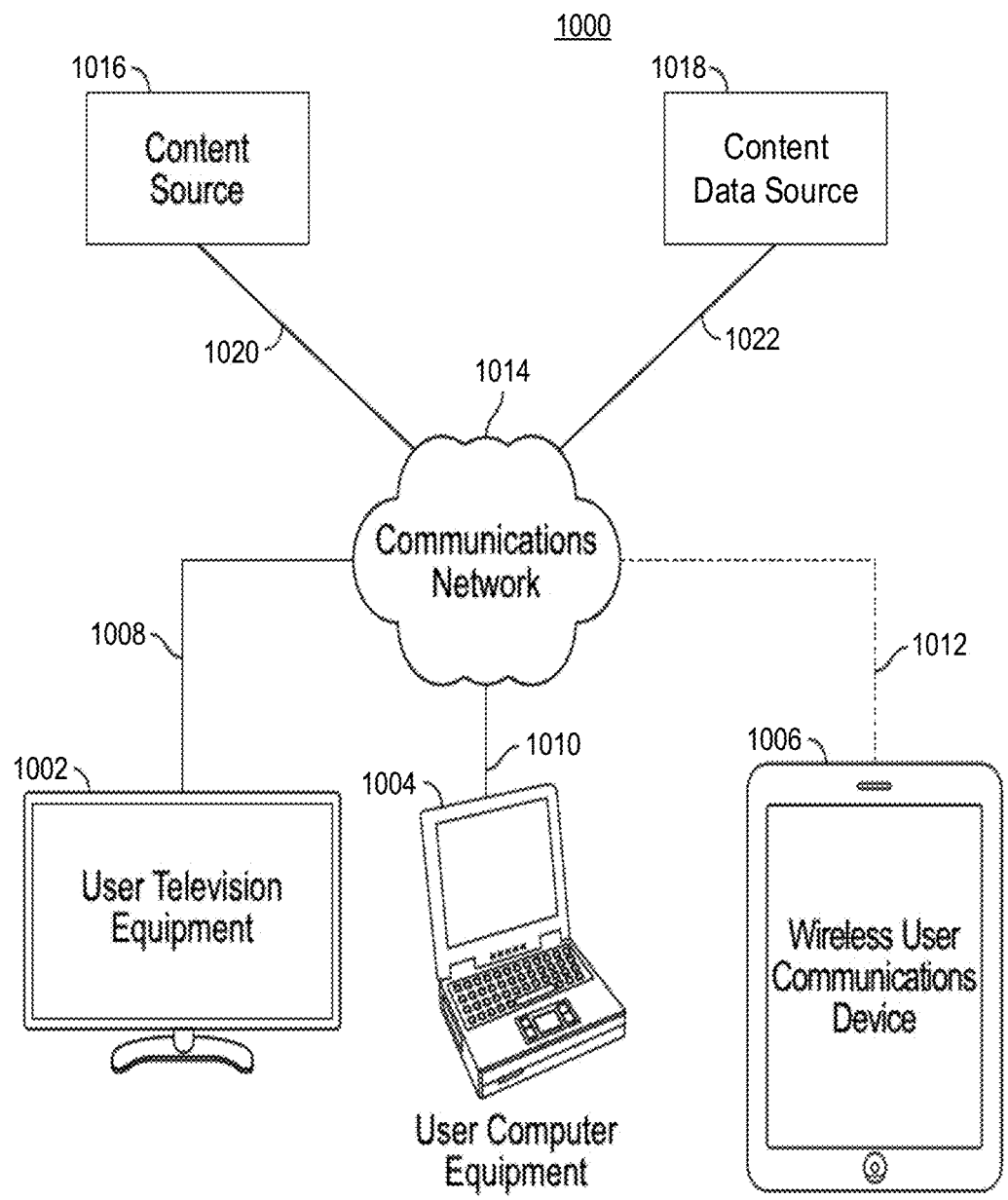
FIG. 10 shows a block diagram of an illustrative media system, in accordance with some embodiments of the disclosure.

FIG. 10 depicts an exemplary media system in accordance with some embodiments of the disclosure in which user equipment device 106, and user equipment device 900 can be implemented in system 1000 of FIG. 10 as user television equipment 1002, user computer equipment 1004, wireless user communications device 1006, or any other type of user equipment suitable for accessing media. For simplicity, these devices may be referred to herein collectively as user equipment. User equipment, on which the media application is implemented, may function as a stand-alone device or may be part of a network of devices. Various network configurations of devices may be implemented and are discussed in more detail below.

User television equipment 1002 may include a set-top box, an integrated receiver decoder (IRD) for handling satellite television, a television set, a digital storage device, or other user television equipment. One or more of these devices may be integrated to be a single device, if desired. User computer equipment 1004 may include a PC, a laptop, a streaming content aggregator, a PC media center, or other user computer equipment. It may include devices like digital assistance, smart speakers, and/or home automation. Wireless user communications device 1006 may include a smartphone, a portable video player, a portable music player, a portable gaming machine, a tablet, a wireless streaming device or other wireless device. It should be noted that the lines are blurred when trying to classify a device as one of the above devices and one device may be categorized into one or more of the categories listed above.

In system 1000, there is typically more than one of each type of user equipment but only one of each is shown in FIG. 10 to avoid overcomplicating the drawing. In addition, each user may utilize more than one type of user equipment (e.g., a user may have a computer and a tablet) and also more than one of each type of user equipment device (e.g., a user may have multiple television sets).

The user equipment may be coupled to communications network 1014. Namely, user television equipment 1002, user computer equipment 1004, and wireless user communications device 1006 are coupled to communications network 1014 via communications paths 1008, 1010, and 1012, respectively. Communications network 1014 is used by the user equipment to obtain the video stream. Communications network 1014 may be one or more networks including the Internet, a mobile phone network, ad-hoc network, or other types of communications network or combination of communications networks. Paths 1008, 1010, and 1012 may separately or together include one or more communications paths, including any suitable wireless communications path. Paths 1008, 1010, and 1012 are drawn as solid lines to indicate they are wireless paths. Communications with the user equipment may be provided by one or more of these communications paths but are shown as a single path in FIG. 10 to avoid overcomplicating the drawing. The user equipment devices may communicate with each other directly through an indirect path via communications network 1014.

System 1000 includes content source 1016 and content data source 1018 coupled to communications network 1014 via communications paths 1020 and 1022, respectively. Paths 1020 and 1022 may include any of the communications paths described above in connection with paths 1008, 1010, and 1012. Communications with the content source 1016 and content data source 1018 may be exchanged over one or more communications paths but are shown as a single path in FIG. 10 to avoid overcomplicating the drawing. In addition, there may be more than one of each of content source 1016 and content data source 1018, but only one of each is shown in FIG. 10 to avoid overcomplicating the drawing. In some embodiments, content source 1016 and content data source 1018 are integrated as one source device. Although communications between sources 1016 and 1018 with user equipment 106 are shown as through communications network 1014, in some embodiments, sources 1016 and 1018 may communicate directly with user equipment devices 1002, 1004, and 1006 via communications paths (not shown) such as those described above in connection with paths 1008, 1010, and 1012.

Content source 1016 may include one or more types of media distribution equipment such as a media server, cable system headend, satellite distribution facility, intermediate distribution facilities and/or servers, Internet providers, on-demand media servers, and other media providers. Content source 1016 may be the originator of media content or may not be the originator of media content. Content source 1016 may also include a remote media server used to store different types of media content (including a media asset selected by a user), in a location remote from any of the user equipment. Systems and methods for providing remotely stored media to user equipment are discussed in greater detail in connection with Ellis et al., U.S. patent application Ser. No. 09/332,244, filed Jun. 11, 1999, which is hereby incorporated by reference herein in its entirety.

System 1000 is intended to illustrate a number of approaches, or network configurations, by which user equipment devices and sources of media content and guidance data may communicate with each other for the purpose of accessing media and data related to the media. The configuration of the devices and paths in system 1000 may change without departing from the scope of the present disclosure.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods. For example, processes 700 and 800 can be performed on any of the devices shown in FIGS. 9-10. Additionally, any of the steps in processes 700 and 800 can be performed in any order, can be omitted, and/or can be combined with any of the steps from any other process.

What is claimed is:

1. A computer-implemented method of content transmission, the method comprising:
   receiving user profile information including a preference in at least one type of scene and at least one type of genre;
   determining whether to reduce streaming bandwidth of a device that transmits content;
   receiving metadata of the content; and
   in response to determining to reduce the streaming bandwidth:
      identifying a relevance level of a first scene of the content based on the metadata associated with the first scene of the content, and based on the user profile information as compared to the metadata;
      identifying a relevance level of a second scene of the content based on the metadata associated with the second scene of the content, and based on the user profile information, wherein the relevance level of the first scene indicates a higher relevance to a user than the relevance level of the second scene, and wherein the first scene comprises scenes of greater interest to the user than the second scene;
      selecting a first quality level based on the relevance level of the first scene and a second quality level based on the relevance level of the second scene; and
      transmitting the first scene at the first quality level and the second scene at the second quality level that is lower than the first quality level.

2. The computer-implemented method of claim 1, further comprising:
   based on the user profile information, determining a respective relevance level of the first scene and the second scene,
   wherein the second relevance level is lower than the first relevance level.

3. The computer-implemented method of claim 1, further comprising:
   based on the metadata of the content, determining a respective importance level of the first scene and the second scene,
   wherein the second importance level is lower than the first importance level.

4. The computer-implemented method of claim 1, further comprising:
   identifying a first frame of the first scene;
   determining a number of edges in a portion within the first frame; and
   based on the number of edges in the portion within the first frame, determining whether to transmit the portion of the first frame at a quality level that is different from the first quality level.

5. The computer-implemented method of claim 1, further comprising:
   identifying a first frame of the first scene;
   determining a number of curves in a portion of the first frame of the first scene; and
   based on the number of curves in the portion within the first frame, determining whether to transmit the portion of the first frame at a quality level that is different from the first quality level.

6. The computer-implemented method of claim 1, further comprising:
   identifying a first frame of the first scene;
   generating a color map of the first frame of the first scene, the color map comprising color values of the first frame;
   determining a number of regions based on the color values of the first frame;
   based on the number of regions, determining whether to transmit the first frame at a quality level that is different from the first quality level.

7. The computer-implemented method of claim 1, further comprising:
   calculating a first chunk score for the first scene;
   calculating a second chunk score for the second scene; and
   wherein the first chunk score is calculated based on a respective frame score; and
   wherein the second chunk score is calculated based on a respective frame score.

8. The computer-implemented method of claim 1, wherein determining whether to reduce the streaming bandwidth of the device that transmits the content comprises:
   determining a network bandwidth of the device based on a location of the device; and
   determining that the network bandwidth of the device is lower than a threshold value.

9. The computer-implemented method of claim 1, wherein determining whether to reduce the streaming bandwidth of the device that transmits the content comprises:
   determining a network condition for a communication network; and
   calculating available streaming bandwidth based on the determined network condition.

10. The computer-implemented method of claim 1, wherein the first quality level comprises at least one of a first bitrate, a first resolution, and a first compression rate.

11. A system of content encoding, the system comprising:
   control circuitry configured to:
      receive user profile information including a preference in at least one type of scene and at least one type of genre;
      determine whether to reduce streaming bandwidth of a device that transmits content;
      receive metadata of the content; and
      in response to determining to reduce the streaming bandwidth:
         identify a relevance level of a first scene of the content based on the metadata associated with the first scene of the content, and based on the user profile information as compared to the metadata;
         identify a relevance level of a second scene of the content based on the metadata associated with the second scene of the content, and based on the user profile information, wherein the relevance level of the first scene indicates a higher relevance to a user than the relevance level of the second scene, and wherein the first scene comprises scenes of greater interest to the user than the second scene;
         select a first quality level based on the relevance level of the first scene and a second quality level based on the relevance level of the second scene; and transmit the first scene at the first quality level and the second scene at the second quality level that is lower than the first quality level.

12. The system of claim 11, wherein the control circuitry is further configured to:
based on the user profile information, determine a respective relevance level of the first scene and the second scene,
wherein the second relevance level is lower than the first relevance level.

13. The system of claim 11, wherein the control circuitry is further configured to:
based on the metadata of the content, determine a respective importance level of the first scene and the second scene,
wherein the second importance level is lower than the first importance level.

14. The system of claim 11, wherein the control circuitry is further configured to:
identify a first frame of the first scene;
determine a number of edges in a portion within the first frame; and
based on the number of edges in the portion of within the first frame, determine whether to transmit the portion of the first frame at a quality level that is different from the first quality level.

15. The system of claim 11, wherein the control circuitry is further configured to:
identify a first frame of the first scene;
determine a number of curves in a portion of the first frame of the first scene; and
based on the number of curves in the portion within the first frame, determine whether to transmit the portion of the first frame at a quality level that is different from the first quality level.

16. The system of claim 11, wherein the control circuitry is further configured to:
identify a first frame of the first scene;
generate a color map of the first frame of the first scene, the color map comprising color values of the first frame;
determine a number of regions based on the color values of the first frame;
based on the number of regions, determine whether to transmit the first frame at a quality level that is different from the first quality level.

17. The system of claim 11, wherein the control circuitry is further configured to:
calculate a first chunk score for the first scene;
calculate a second chunk score for the second scene; and
wherein the first chunk score is calculated based on a respective frame score; and
wherein the second chunk score is calculated based on a respective frame score.

18. The system of claim 11, wherein the control circuitry, when determining whether to reduce the streaming bandwidth of the device that transmits the content, is configured to:
determine network bandwidth of the device based on a location of the device; and
determine that the network bandwidth of the device is lower than a threshold value.

19. The system of claim 11, wherein the control circuitry, when determining whether to reduce the streaming bandwidth of the device that transmits the content, is configured to:
determine a network condition for a communication network; and
calculate available streaming bandwidth based on the determined network condition.

20. The system of claim 11, wherein the first quality level comprises at least one of a first bitrate, a first resolution, and a first compression rate.

* * * * *